United States Patent
Gill

(10) Patent No.: US 7,218,486 B2
(45) Date of Patent: May 15, 2007

(54) EXTENDED PINNED LAYER ON TOP OF LEAD/HB TO AVOID AMPLITUDE FLIPPING

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 401 days.

(21) Appl. No.: 10/878,820

(22) Filed: Jun. 28, 2004

(65) Prior Publication Data

US 2005/0286177 A1    Dec. 29, 2005

(51) Int. Cl.
  *G11B 5/33*    (2006.01)
  *G11B 5/127*   (2006.01)
(52) U.S. Cl. .................................. 360/324.11
(58) Field of Classification Search ............ 360/324.11
  See application file for complete search history.

(56) References Cited

U.S. PATENT DOCUMENTS

| | | | |
|---|---|---|---|
| 2003/0043503 A1 | 3/2003 | Grigoryevich et al. ...... | 360/110 |
| 2003/0133233 A1 | 7/2003 | Gill et al. .............. | 360/324.12 |
| 2003/0179500 A1 | 9/2003 | Gill et al. .................... | 360/240 |
| 2003/0231437 A1 | 12/2003 | Childress et al. ....... | 360/324.12 |
| 2005/0007707 A1* | 1/2005 | Gill ........................ | 360/324.11 |
| 2005/0180061 A1* | 8/2005 | Ding et al. ............. | 360/324.12 |
| 2005/0243475 A1* | 11/2005 | Heim ..................... | 360/324.11 |
| 2005/0249979 A1* | 11/2005 | Gill ............................ | 428/828 |

* cited by examiner

*Primary Examiner*—Brian E. Miller
(74) *Attorney, Agent, or Firm*—Zilka-Kotab, PC

(57) ABSTRACT

A magnetoresistive sensor having a self pinned structure formed above a free layer and having a pinning stabilization structure to avoid flipping of the magnetic moment of the pinned layer. The pinned layer stabilization structure includes hard magnetic structures formed over the leads in an area outside of the active area of the sensor, and a magnetic layer extends over the active area of the sensor and over the hard magnetic structures outside of the active area of the sensor.

22 Claims, 4 Drawing Sheets

EXTENDED PINNED LAYER ON TOP OF LEAD/HB TO AVOID AMPLITUDE FLIPPING

FIELD OF THE INVENTION

The present invention relates to giant magnetoresistive (GMR) sensors and more particularly to a top self-pinned sensor having improved resistance to amplitude flipping.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Traditionally, the magnetization of a pinned layer has been fixed by exchange coupling one of the ferromagnetic layers (AP1) with a layer of antiferromagnetic material such as PtMn. While an antiferromagnetic material such as PtMn does not in and of itself have a magnetization, when exchange coupled with a magnetic material, it can strongly pin the magnetization of the ferromagnetic layer.

The ever increasing quest for faster data rates and increased data capacity requires ever decreasing bit lengths, in order to fit more bits onto a given inch of data track. This in turn requires sensor to have decreased sensor thickness (stack height). Unfortunately, in order to pin a pinned layer as described above through exchange coupling with an AFM layer, the AFM layer must be deposited very thick relative to the other layers in the sensor stack. In the drive for decreased sensor thickness such an AFM layer uses an unacceptable amount of gap budget.

In order to overcome this, sensors have recently been designed with self pinned pinned layers. Pinning in a self pinned layer is generally achieved primarily by stress induced anisotropy caused by constructing the pinned layers of a material having a high positive magnetostriction. Compressive forces which inevitably occur in a sensor, in combination with the high positive magnetostriction of the pinned layers causes the magnetization to be pinned in a desired direction perpendicular to the air bearing surface (ABS). A self pinned structure includes first and second layers of ferromagnetic material that are antiparallel coupled across a coupling layer such as Ru, similar to the conventional AP coupled pinned layer described above. In order to increase pinning strength, in a self pinned layer structure the magnetic thicknesses of the two ferromagnetic layers (AP1 and AP2) are substantially equal (ie. $\delta m=0$).

Although self pinned structures have shown promise for decreasing stack height of a sensor, the can be prone to amplitude flipping. Amplitude flipping occurs when the directions of magnetization of the pinned layer flip 180 degrees. This renders the head unusable. As discussed above, self pinned sensors rely on stress induced anisotropy of magnetostricive materials used in the pinned layers. The magnetostriction of a material is dependent on temperature. The magnetosrictive properties of the materials making up the pinned layers in a self pinned head greatly decrease or cease altogether at higher temperatures. During and event such as a head disk contact, or an electrostatic discharge (ESD), temperatures can rise to the point that the materials making up the pinned layer momentarily cease to be magnetostrictive. In addition, mechanical strains on the head during an ESD event or head disk interface can cause the compressive stresses to momentarily cease. This momentary loss of magnetostriction and/or compressive stress can momentarily eliminate the anisostropy that maintains pinning of the self-pinned layers. This can allow the orientation of the magnetic moments to flip directions 180 degrees, rendering the head useless.

As can be seen from the above, there is a strong felt need for a means for stabilizing pinning of a self pinned sensor in order to take advantage of the decreased thickness provided by the use of self pinned layers while avoiding unacceptable amplitude flipping. Such a stabilizing mechanism would provide such self-pinned heads with sufficient robustness to render them practical for consumer and commercial application.

SUMMARY OF THE INVENTION

The present invention provides a self pinned giant magnetoresistive (GMR) sensor having a self pinned structure located above the free layer, (ie. top spin valve). The sensor includes a sensor stack having laterally opposed sides and a top surface. First and second hard magnetic bias layers disposed at either lateral side of the sensor stack provide magnetic biasing in the free layer. First and second electrically conductive leads are formed over the first and second hard bias layers. A hard magnetic structure is provided over each of the leads. These hard magnetic bias structures extend laterally outward, not covering the top surface of the sensor. A layer of magnetic material, which can be referred to as a stabilizing layer, covers the top of the sensor as well as the hard magnetic structures formed over each lead.

The hard magnetic structures keep the magnetic moment of the stabilizing layer pinned in the regions outside of the sensor area. This advantageously, stabilizes the magnetic moment of the stabilization layer in the region over the sensor. Exchange coupling between the stabilizing layer and the pinned layer keeps the magnetic moment of the pinned layer oriented as desired even during an event such as a head disk contact or an electrostatic discharge.

The pinned layer can be a self pinned layer, in which case it can include first and second layers of magnetic, high magnetostriction material (such as CoFe) having a coupling layer (such as Ru) sandwiched between. The two layers can be constructed so that the bottom magnetic layer can have a thickness that is substantially equal to the thicknesses of the upper layer and the stabilization layer combined. In this way, the portion of the stabilization layer formed over the sensor stack acts as a part of the pinned layer structure. The portions of the stabilization structure outside of the sensor stack area are have magnetic moments fixed by exchange coupling with the hard magnetic structures.

The first and second hard magnetic structures formed over the first and second leads can be for example, a layer of CoPt formed over a layer of Cr. The Cr underlayer advantageously effects the grain structure of the CoPt deposited thereon to make the CoPt formed over the Cr magnetically hard.

Optionally, the first and second hard magnetic structures formed over the first and second leads can be AP coupled structures, each including a pair of magnetic layers having an AP coupling layer sandwiched between. The antiparallel coupling of such a structure results in a very high magnetic coersivity for setting the magnetic moment of the stabilizing layer formed thereon. In such case the magnetic layers of the hard magnetic structures could comprise CoFe, and the coupling layer could comprise Ru.

These and other advantages of the invention will be better appreciated upon reading the following detailed description in conjunction with the accompanying Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
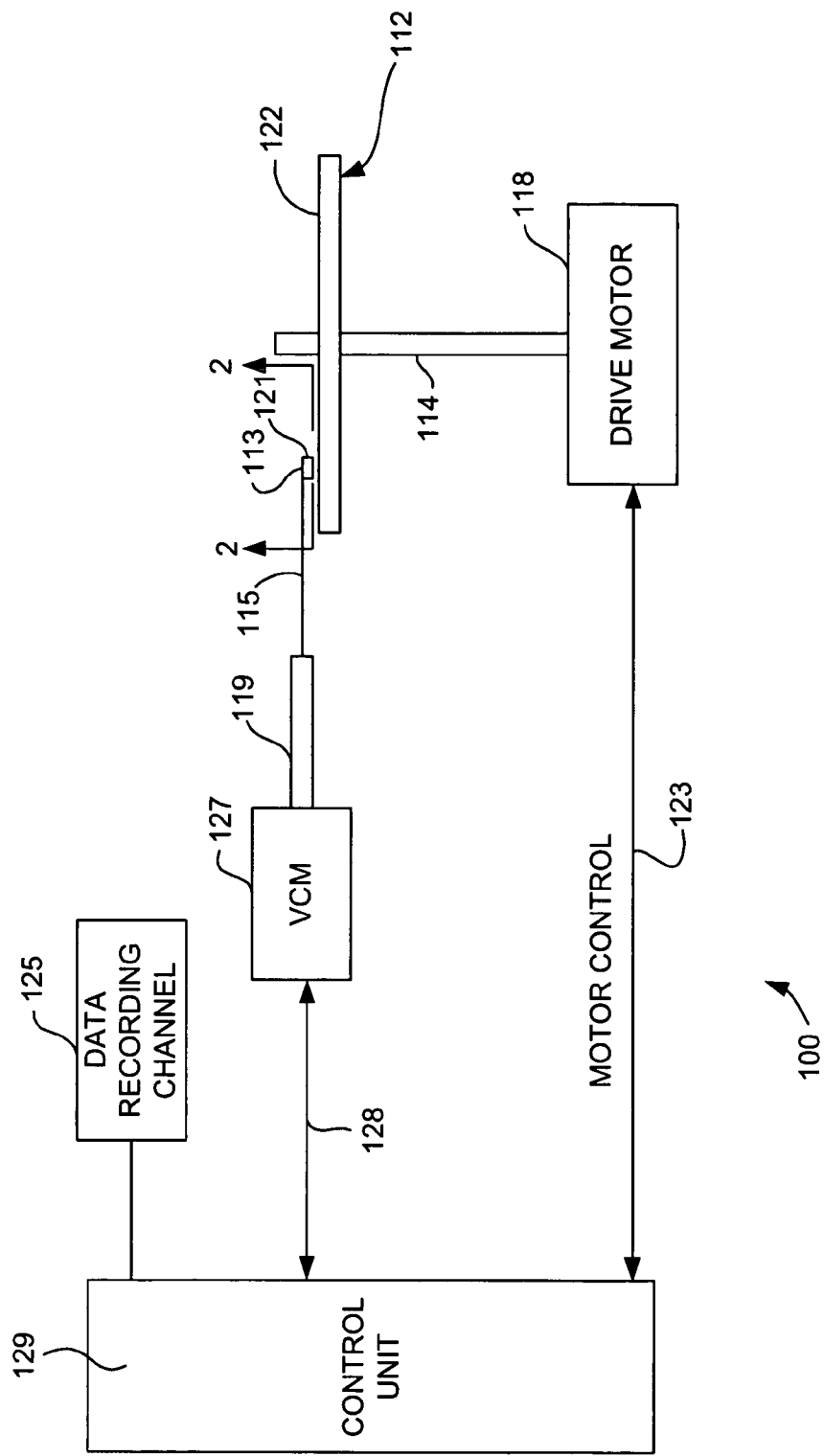
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
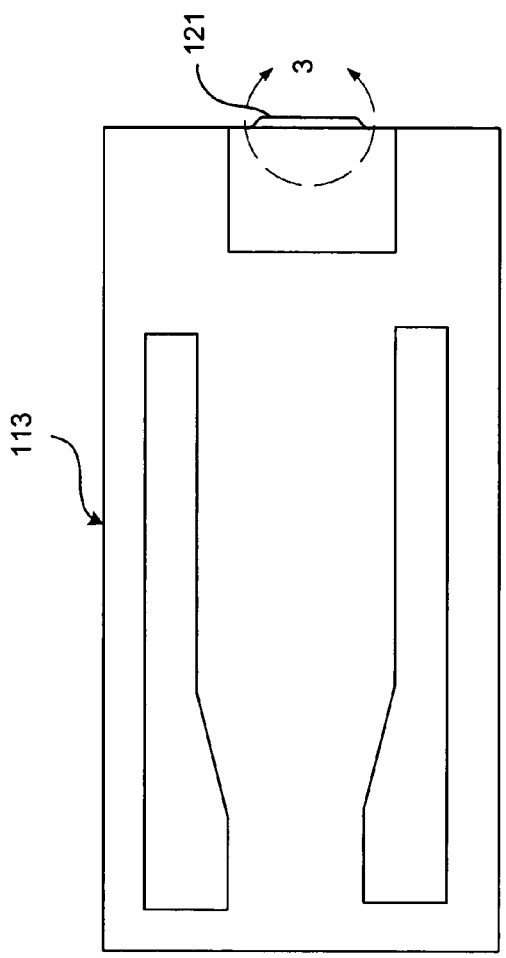
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
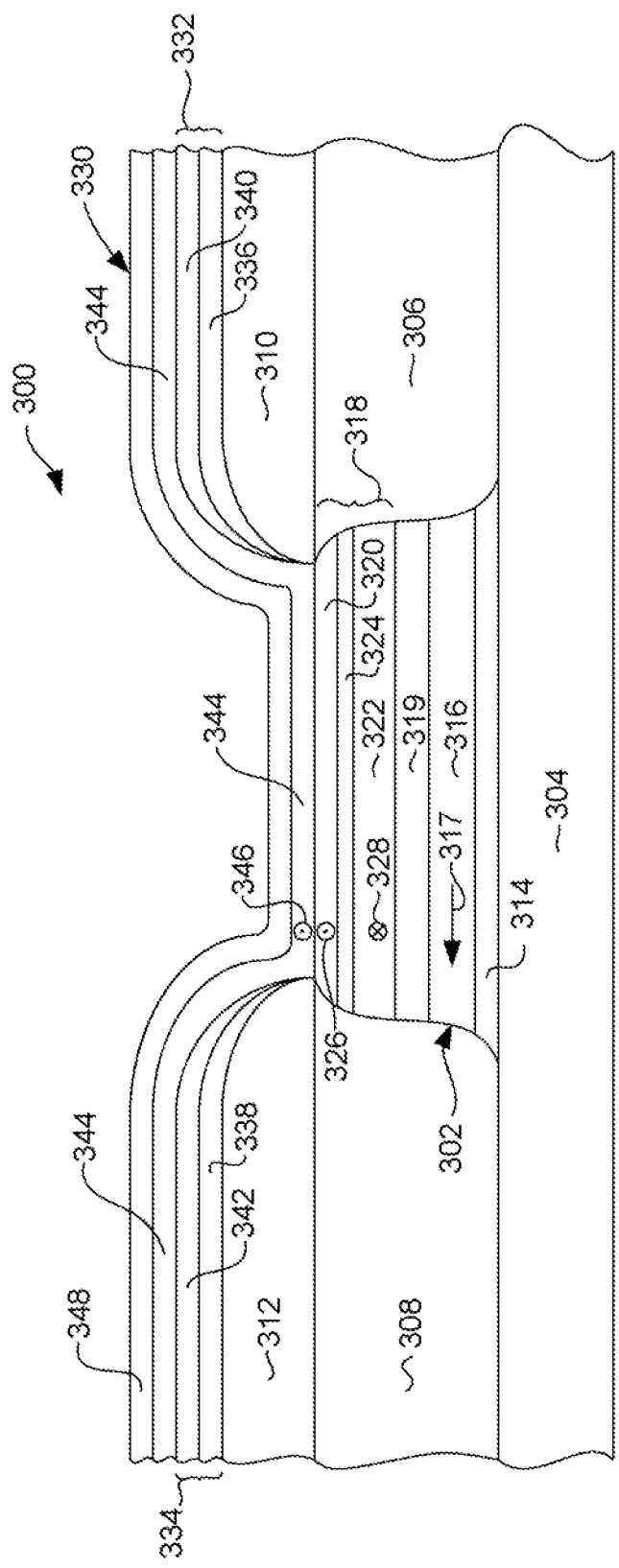
FIG. 3 is an ABS view of a magnetic sensor according to an embodiment of the present invention taken from circle 3 of FIG. 2.

With reference now to FIG. 3, a magnetoresistive sensor 300 according to an embodiment of the invention includes a sensor stack 302 formed on a dielectric first gap layer 304, which may be for example $Al_2O_3$ or some other non-magnetic electrically insulating material. First and second hard bias layers 306, 308, constructed of a magnetically hard (ie. high coercivity) material such as CoPtCr extend laterally outward from first and second laterally opposed sides of the sensor stack 302. First and second electrically conductive leads 310, 312 are formed over the hard bias layers 306, 308. The inner terminations of the leads 310, 312 define an active area of the sensor or track width TW.

The sensor stack 302 includes a seed layer 314, upon which the other sensor layers are deposited. The seed layer 314 is made of a material that promotes a desired epitaxial growth in the subsequently deposited layers in order to achieve desirable GMR performance. A magnetic free layer 316 is formed on top of the seed layer. The free layer 316 is constructed of a magnetic material, which can be for example Co, CoFe, or one or more of CoFe or Co and NiFe, and has a magnetic moment 317 that is biased in a direction parallel with the ABS, but is free to rotate in response to a magnetic field. Biasing is provided to the free layer 316, by magnetostatic field from the first and second hard bias layers 306, 308.

The sensor stack 302 also includes a magnetic pinned layer 318, and a non-magnetic, electrically conductive spacer layer 319, such as Cu, sandwiched between the pinned layer 318 and the free layer 316. The pinned layer has magnetic moment that is pinned in a desired direction perpendicular to the ABS. This magnetic moment can be self pinned or can be pinned by exchange coupling with a layer of antiferromagnetic (AFM) material (not shown). The pinned layer 318 is preferably self pinned. For purposes of illustration then, the pinned layer 318 includes a first magnetic layer (AP1) 320 and a second magnetic layer (AP2) 322. The AP1 and AP2 layers 320, 322 are separated from one another by a non-magnetic, electrically conductive AP coupling layer 324, which can be for example Ru. The coupling layer 324 is constructed to have a thickness to strongly antiparallel couple the AP1 and AP2 layers. If the coupling layer is Ru, then this thickness can be for example 2 to 8 Angstroms or about 4 Angstroms.

The strong antiparallel coupling causes the AP1 layer 320 to have a magnetic moment 326 that is pinned in direction perpendicular to the ABS and that is antiparallel with a magnetic moment 328 of the AP2 layer 322. Since the pinned layer 318, is described as a self pinned structure, pinning of the magnetic moments 326, 328 is maintained by magnetic anisotropy, primarily due to positive magnetostriction of the materials making up the AP1 and AP2 layers 320, 322. This positive magnetostriction, along with compressive stresses in the sensor 300, generates a strong magnetic anisotropy in the layers 320, 322 in the direction perpendicular to the ABS. In order to provide this positive magnetostriction and also provide desired magnetic GMR properties for proper sensor operation, the AP1 and AP2 layers can be constructed of for example CoFe, or more specifically $CoFe_{30}$.

As discussed above, the pinning of the self pinned layer 318 is temperature dependent. The magnetostrictive properties of the materials making up the pinned layer 318 cease at elevated temperature. In addition, momentary loss of compressive stresses on the sensor, such as from mechanical or thermal strain, can cause a momentary loss of the magnetostriction induced magnetic anisotropy. Either or both of these factors can cause a momentary loss of pinning, which can result in amplitude flipping, wherein the moments 326, 328 of each of the layer 320, 322 flip 180 degrees. Such temperature spikes and mechanical and thermal strains can occur as a result of an event such as an electro-static discharge or a head disk contact.

In order to prevent amplitude flipping during such an event, the sensor according to the presently described embodiment, includes a pinned layer biasing mechanism 330. The pinned layer biasing mechanism 330 according to the presently described embodiment of the invention includes third and fourth hard magnetic structures 332, 334. These layers are termed "second and third" hard magnetic structure so as not to confuse them with the first and second hard bias layers 306, 308 used to bias the free layer 316. The third and fourth hard magnetic structures each preferably include a seed layer of Cr 336, 338 formed over each of the leads 310, 312. The third and fourth hard magnetic layers 332, 334 further include a layer of hard magnetic material 340, 342 formed over each of the Cr seed layers 336, 338. The hard magnetic material layers 340, 342 can be for example CoPt and can have a thickness of 25 to 35 Angstroms or about 30 Angstroms. The Cr under layers 336, 338 can have a thickness of 10 to 20 Angstroms. As can be seen with reference to FIG. 3, the third and fourth hard magnetic structures 332, 334, including the Cr underlayers 336, 338, and the hard magnetic layers 340, 342 extend over the leads 310, 312, terminating at the sensor stack 302 and extending laterally outward therefrom.

In With continued reference to FIG. 3, a stabilization layer 344, extends over the top of the sensor stack 302 within the active area or track width (TW) of the sensor 300) and also extends over the third and fourth hard magnetic structures 332, 334. The stabilization layer 344 can be constructed of several magnetic materials. and is preferably constructed of CoPt and can have a thickness of about 10 to 20 Angstroms. The Cr underlayers 336. 338 initiate a crystalline structure that carries through to the overlying hard magnetic layers 340, 342 and makes the CoPt magnetically hard. This crystalline structure also carries through to the stabilization layer 344, making the stabilization layer 344 magnetically hard in the portions that overly the third and fourth hard magnetic structures 332, 334. The portions of the stabilization layer 344 that overly the sensor stack 302 assume the crystalline structure of the layers of sensor stack 302, a crystalline structure that makes the stabilization layer 344 magnetically softer in this region over the sensor stack 302 (ie. within the active area (TW) of the sensor).

The stabilization layer 344 has a magnetic moment 346 that is oriented in the same direction as that of the AP1 layer 326. In fact, the portion of the stabilization layer that lies directly over the AP1 layer is exchange coupled with and effectively serves as a part of the AP1 layer 320. To this end, the AP1 layer 320 and the overlying stabilization layer 344 should have a combined thickness that is about equal to the thickness of the AP2 layer 322.

As will be appreciated, in the event that the sensor 300 undergoes a head disk contact or an electro-static discharge that momentarily eliminates the magnetostrictive magnetic anisotropy, the hard magnetic structures 332, 334, (which are exchange coupled with the stabilization layer 344) will keep the magnetic moment 346 of the stabilization layer 344 oriented as desired throughout the period of lost anisotropy of the pinned layer 318. This moment 346 is maintained by the high magnetic coercivity of the hard magnetic structures 332, 334 as of the portions of the stabilization 344 lying thereover. Finally a capping layer 348, such as Ta, can be provided on top of the stabilization layer 344 to protect the sensor 300 from damage during subsequent manufacturing processes, such as annealing processes.

Figure 4:
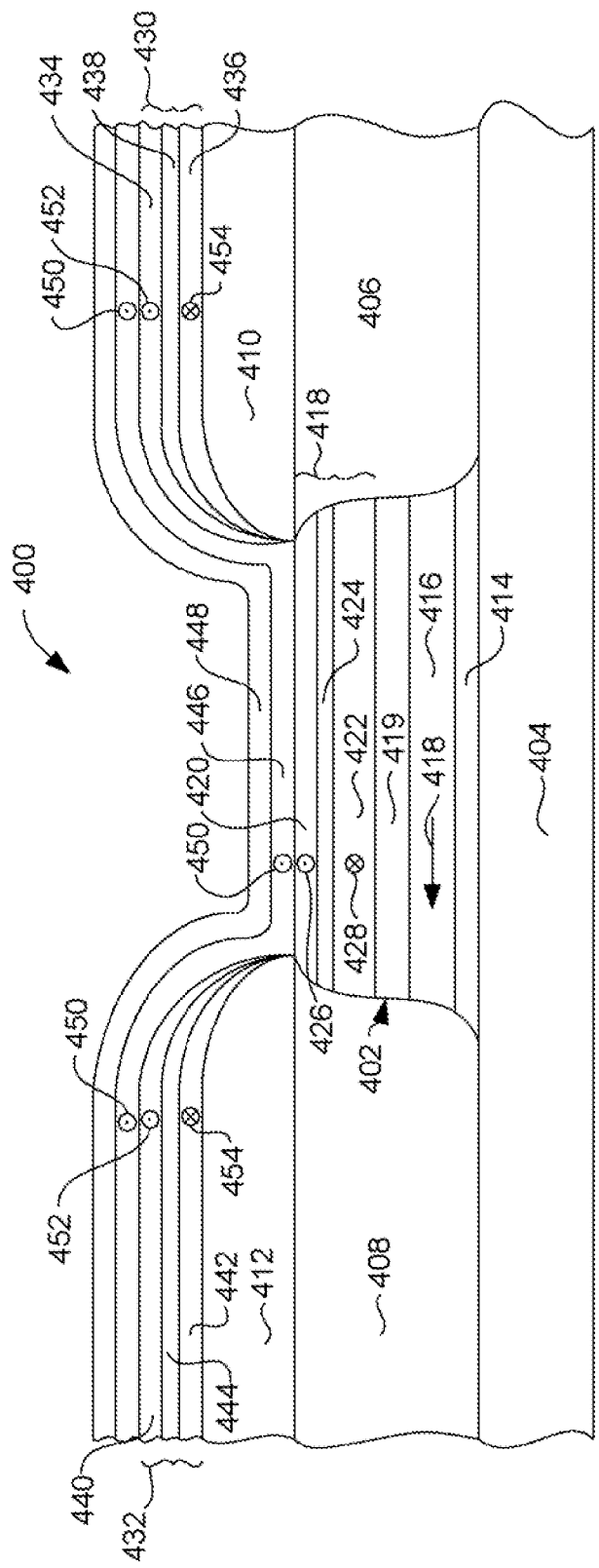
FIG. 4 is an ABS view of a sensor according to an alternate embodiment of the invention.

With reference now to FIG. 4, a magnetoresistive sensor 400 according to an alternate embodiment of the invention includes a sensor stack 402 formed on a dielectric first gap layer 404, which may be for example $Al_2O_3$ or some other non-magnetic electrically insulating material. First and second hard bias layers 406, 408, constructed of a magnetically hard (ie. high coercivity) material such as CoPtCr extend laterally outward from first and second laterally opposed sides of the sensor stack 402. First and second electrically conductive leads 410, 412 are formed over the hard bias layers 406, 408. The inner terminations of the leads 410, 412 define an active area of the sensor or track width TW.

The sensor stack 402 includes a seed layer 414, upon which the other sensor layers are deposited. The seed layer is made of a material that promotes a desired epitaxial growth in the subsequently deposited layers in order to achieve desirable GMR performance. A magnetic free layer 416 is formed on top of the seed layer. The free layer 416 is constructed of a magnetic material, which can be for example Co, CoFe, or one or more of CoFe or Co and NiFe, and has a magnetic moment 418 that is biased in a direction parallel with the ABS, but is free to rotate in response to a magnetic field. Biasing is provided to the free layer 416, by magnetostatic field from the first and second hard bias layers 406, 408.

The sensor stack 402 also includes a magnetic pinned layer 418. The pinned layer has magnetic moments that are pinned in a desired direction perpendicular to the ABS. These magnetic moments can be self pinned or can be pinned by exchange coupling with a layer of antiferromagnetic (AFM) material (not shown). The pinned layer 418 is preferably self-pinned. A non-magnetic, electrically conductive spacer layer 419, such as Cu, is sandwiched between the pinned layer 418 and the free layer 416. For purposes of illustration then, the pinned layer 418 includes a first magnetic layer (AP1) 420 and a second magnetic layer (AP2) 422. The AP1 and AP2 layers 420, 422 are separated from one another by a non-magnetic, electrically conductive AP coupling layer 424, which can be for example Ru. The coupling layer 424 is constructed to have a thickness to strongly antiparallel couple the AP1 and AP2 layers. If the coupling layer is Ru, then this thickness can be for example 2 to 8 Angstroms or about 4 Angstroms.

The strong antiparallel coupling causes the AP1 layer 420 to have a magnetic moment 426 that is pinned in direction perpendicular to the ABS and that is antiparallel with a magnetic moment 428 of the AP2 layer. Since the pinned layer 418, is described as a self pinned structure, pinning of the magnetic moments 426, 428 is maintained by magnetic anisotropy, primarily due to positive magnetostriction of the materials making up the AP1 and AP2 layers 420, 422. This positive magnetostriction, along with compressive stresses in the sensor 400, generates a strong magnetic anisotropy in the layers 420, 422 in the direction perpendicular to the ABS. In order to provide this positive magnetostriction and also provide desired magnetic, GMR properties for proper sensor operation, the AP1 and AP2 layers can be constructed of for example CoFe, or more specifically $CoFe_{30}$.

With reference still to FIG. 4, the sensor 400 of the presently described invention includes third and fourth hard magnetic structures 430, 432 formed over the first and second leads 410, 412 respectively. The hard magnetic structures 430, 432 of the presently described embodiment are AP coupled structures. The third hard magnetic structure 430 includes a first magnetic layer (second AP1 layer) 434 and a second magnetic layer (second AP2 layer) 436, both of which are AP coupled across a second non-magnetic, electrically conductive coupling layer 438. Similarly, the fourth hard magnetic structure includes a first magnetic layer (third AP1 layer) 440 and a second magnetic layer (third AP2 layer) 442, both of which are AP coupled across a third non-magnetic, electrically conductive coupling layer 444. The second and third AP1 layers 434, 440 as well as the second and third AP2 layers 436 442 can be constructed of, for example, CoFe, and the second and third AP coupling layers 438, 444 can be constructed of for example Ru. In addition, a seed layer (not shown) can optionally be provided between the first and second leads 410, 412 and the hard magnetic structures 430, 432 if needed to promote a desired crystalline structure in the third and fourth hard magnetic structures 430, 432.

With continued reference to FIG. 4, as an alternate embodiment, the third and fourth hard magnetic structures 430, 432 can be constructed with the first layers 436, 436, 442 being CoPt, while the second magnetic layers 438, 440 can be CoFe. The first magnetic layers 436, 442 would of course be antiparallel coupled with the second magnetic layers 434, 440. This embodiment may be more attractive where improved exchange coupling between the hard magnetic structures 430, 432 and the stabilization layer 446 is needed.

With reference still to FIG. 4, a stabilization layer 446 is provided, covering the sensor stack and the 302 and the third and fourth hard magnetic structures 430, 432. In addition, a capping layer 448, such as Ta may be provided over the stabilization layer to protect the sensor 300 during subsequent manufacturing processes. The stabilization layer and hard magnetic structures 430, 432 act to prevent amplitude flipping in a manner similar to that described with reference to the previously described embodiment. The antiparallel coupling within the third and fourth magnetic structures 430, 432 provides a magnetic coercivity that helps those structures to maintain their magnetic moments during an event such as a head disk contact or a electrostatic discharge (ESD).

The first AP2 layer 422 of the pinned layer 418 preferably has a thickness that is about equal to the combined thickness of the first AP1 layer 420 and the stabilization layer 446.

Similarly, the second AP2 layer 436 preferably has a thickness that is substantially equal to the combined thicknesses of the second AP1 layer 434 and the stabilization layer 446. Also, the third AP2 layer 442 preferably has a thickness that is about equal to the combined thicknesses of the third AP1 layer 440 and the stabilization layer 446. The stabilization layer 446 has a magnetic moment 450 that is parallel with the moment 426 of the first AP1 layer 420. In order to maintain this moment 450, the second and third AP1 layers have moments 452 parallel with the moments 450 and 426. The second and third AP2 layers each have magnetic moments 454 that are antiparallel with the moments 450 and 452.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetoresistive sensor, comprising:
    a sensor stack having a top surface and first and second laterally opposed sides defining a width there between, the sensor stack comprising:
        a magnetic free layer;
        a non-magnetic spacer layer formed over the free layer; and
        a pinned layer formed over the spacer layer;
    first and second hard magnetic bias layers extending laterally from the laterally opposed sides of the sensor stack;
    first and second leads disposed over the first and second hard magnetic layers respsectively;
    a first electrically conductive, non-magnetic lead formed over the first hard magnetic bias layer, the first lead terminating at the sensor stack and extending outward therefrom;
    a second electrically conductive, non-magnetic lead formed over the second hard magnetic bias layer, the second lead terminating at the sensor stack and extending outward therefrom;
    a third hard magnetic structure formed over the first lead, terminating at the sensor stack and extending laterally outward therefrom;
    a fourth hard magnetic structure formed over the second lead, terminating at the sensor stack and extending laterally outward therefrom; and
    a stabilizing layer of magnetic material extending across at least a portion of the top of the sensor stack and extending across at least a portion of each of the third and fourth hard magnetic structures.

2. The sensor as in claim 1, further comprising a capping layer formed over the stabilizing layer.

3. The sensor as in claim 2. wherein the capping layer comprises Ta.

4. The sensor as in claim 1, wherein the pinned layer comprises:
    a first magnetic AP1 layer;
    a first magnetic AP2 layer;
    a first non-magnetic antiparallel coupling layer sandwiched between the
    AP1 layer and the AP2 layer, the coupling layer being of such a thickness
    as to strongly antiparallel couple the AP1 and AP2 layers.

5. The sensor as in claim 4, wherein the first AP1 layer and the first AP2 layer each comprise CoFe.

6. The sensor as in claim 4, wherein the first coupling layer comprises Ru.

7. The sensor as in claim 4, wherein the first AP1 layer and the first AP2 layer each comprise CoFe30.

8. The sensor as in claim 4, wherein the third hard magnet structure comprises:
    a second AP1 layer;
    a second AP2 layer; and
    a second coupling layer disposed between the second AP1 layer and
    second AP2 layer, the second coupling layer being of such a thickness to antiparallel couple the second AP1 and second AP2 layers; and
    wherein the fourth hard magnetic structure comprises:
    a third AP1 layer;
    a third AP2 layer; and
    a third coupling layer disposed between the third AP1 layer and the third AP2 layer, the third coupling layer being of such a thickness to antiparallel couple the third AP1 and third AP2 layers.

9. The sensor as in claim 8, wherein the second AP1 layer, second AP2 layer, and third AP2 layer, each comprise CoFe.

10. The sensor as in claim 8, wherein the second AP1 layer, second AP2 layer, third AP1 layer, and third AP2 layer each comprise CoFe, and wherein the second and third coupling layers each comprise Ru.

11. The sensor as in claim 8, wherein the stabilizing layer comprises CoFe.

12. The sensor as in claim 8, wherein:
    the first AP1 layer is disposed between the first coupling layer and the stabilizing layer;
    the first AP2 layer is disposed between the first coupling layer; and
    the AP2 layer has a thickness that is substantially equal to a thickness of the AP1 layer and a thickness of the stabilizing layer combined.

13. The sensor as in claim 1, wherein the stabilizing layer comprises CoFe.

14. The sensor as in claim 1, wherein the third and fourth hard magnetic structures each comprise a layer of Cr and a layer of CoPt.

15. The sensor as in claim 1, wherein:
    the third hard magnetic structure comprises a first layer of Cr formed over the first lead; and a first layer of CoPt formed over the first layer of Cr; and
    the fourth hard magnetic structure comprises a second layer of Cr formed over the second lead; and a second layer of CoPt formed over the second layer of Cr.

16. The sensor as in claim 15 wherein the stabilization layer CoPt.

17. The sensor as in claim 16 wherein:
    the first and second layers of Cr have a thickness of 10 to 20 Angstroms:
    the first and second layers of CoPt of the third and fourth hard magnetic structures each have a thickness of about 30 Angstroms; and
    the stabilization layer has a thickness of 10 to 20 Angstroms.

18. The sensor as in claim 16, wherein the pinned layer comprises:
    a magnetic AP1 layer;
    a magnetic AP2 layer; and
    a non-magnetic, electrically conductive coupling layer disposed between the AP1 layer and the AP2 layer, the coupling layer being of such a thickness as to antiparallel couple the AP1 and AP2 layers.

19. The sensor as in claim 18, wherein:
the AP1 layer is disposed between the coupling layer and the stabilization layer,
the AP2 layer is disposed between the coupling layer and the spacer layer; and
the AP2 layer has a thickness that is substantially equal to the sum of a thickness of the AP1 layer and a thickness of the stabilization layer.

20. The sensor as in claim 19, wherein the AP1 layer and the AP2 layer each comprise CoFe.

21. The sensor as in claim 1, wherein an area located between the first and second leads defines an active area the third and fourth hard magnetic structures are disposed outside of the active area.

22. A magnetic recording system, comprising:
a magnetic medium;
an actuator;
a slider connected with the actuator for movement adjacent to the magnetic medium; and
A magnetoresistive sensor, comprising:
a sensor stack having a top surface and first and second laterally opposed sides defining a width there between, the sensor stack comprising:
a magnetic free layer;
a non-magnetic spacer layer formed over the free layer; and
a pinned layer formed over the spacer layer;
first and second hard magnetic bias layers extending laterally from the laterally opposed sides of the sensor stack;
first and second leads disposed over the first and second hard magnetic layers respsectively;
a first electrically conductive, non-magnetic lead formed over the first hard magnetic bias layer, the first lead terminating at the sensor stack and extending outward therefrom;
a second electrically conductive, non-magnetic lead formed over the second hard magnetic bias layer, the second lead terminating at the sensor stack and extending outward therefrom;
a third hard magnetic structure formed over the first lead, terminating at the sensor stack and extending laterally outward therefrom;
a fourth hard magnetic structure formed over the second lead, terminating at the sensor stack and extending laterally outward therefrom; and
stabilizing layer of magnetic material extending across at least a portion of the top of the sensor stack and extending across at least a portion of each of the third and fourth hard magnetic structures.

* * * * *

UNITED STATES PATENT AND TRADEMARK OFFICE
CERTIFICATE OF CORRECTION

| | | |
|---|---|---|
| PATENT NO. | : 7,218,486 B2 | Page 1 of 1 |
| APPLICATION NO. | : 10/878820 | |
| DATED | : May 15, 2007 | |
| INVENTOR(S) | : Gill | |

It is certified that error appears in the above-identified patent and that said Letters Patent is hereby corrected as shown below:

In claim 8, column 10, line 5, please replace "magnet" with --magnetic--

Signed and Sealed this

Eighth Day of June, 2010

David J. Kappos
*Director of the United States Patent and Trademark Office*